(12) United States Patent
Ramanathan et al.

(10) Patent No.: US 7,508,773 B2
(45) Date of Patent: Mar. 24, 2009

(54) METHOD OF ANALYZING THE CAPACITY OF A COMPUTER SYSTEM

(75) Inventors: Krishnan Ramanathan, Karnataka (IN); Rajnish Shrivastava, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 710 days.

(21) Appl. No.: 11/099,708

(22) Filed: Apr. 6, 2005

(65) Prior Publication Data

US 2005/0226163 A1 Oct. 13, 2005

(30) Foreign Application Priority Data

Apr. 7, 2004 (GB) .................................. 0407871.3

(51) Int. Cl.
*H04L 12/28* (2006.01)
(52) U.S. Cl. ........................................ 370/255; 709/241
(58) Field of Classification Search ................ 370/241, 370/238, 254–255, 389–392; 709/223, 224, 709/225–226, 238–241, 249, 200, 227, 232, 709/245; 718/105
See application file for complete search history.

(56) References Cited

U.S. PATENT DOCUMENTS

| 5,680,326 | A | 10/1997 | Russ et al. |
| 6,633,544 | B1 * | 10/2003 | Rexford et al. ............... 370/238 |
| 7,082,473 | B2 * | 7/2006 | Breitbart et al. .............. 709/241 |
| 2002/0078238 | A1 * | 6/2002 | Troxel et al. ................. 709/245 |
| 2002/0083163 | A1 * | 6/2002 | Collazo ....................... 709/223 |
| 2002/0194251 | A1 * | 12/2002 | Richter et al. ............... 709/105 |
| 2003/0158800 | A1 * | 8/2003 | Pisello et al. .................. 705/35 |
| 2003/0204759 | A1 | 10/2003 | Singh |
| 2004/0030782 | A1 * | 2/2004 | Nakahara .................... 709/226 |
| 2005/0080696 | A1 * | 4/2005 | Bagchi et al. .................. 705/35 |
| 2006/0047542 | A1 * | 3/2006 | Aschoff et al. .................. 705/7 |
| 2006/0064497 | A1 * | 3/2006 | Bejerano et al. ............. 709/228 |

* cited by examiner

*Primary Examiner*—Hassan Kizou
*Assistant Examiner*—Chuong T Ho

(57) ABSTRACT

A method of analyzing the capacity of a computer system is described. The system is measured to obtain a datum population value N1. A maximum population value N2 is calculated using queuing theory modeling. The maximum population N2 is indicative of a maximum population that the system can sustain whilst satisfying a predetermined Service Level Agreement (SLA). A capacity map is then displayed to illustrate the ratio N1/N2. The capacity map shows the used and remaining capacity in relation to a given SLA.

19 Claims, 3 Drawing Sheets

35

METHOD OF ANALYZING THE CAPACITY OF A COMPUTER SYSTEM

FIELD OF THE INVENTION

The present invention relates to a method of analyzing the capacity of a computer system.

BACKGROUND OF THE INVENTION

Conventional tools for analyzing the capacity of a computer system provide performance metrics such as CPU utilization, memory and I/O usage, amount of network traffic etc.

For instance, the HP Glance tool provides four screens that show the CPU, disk, network and memory views of a server.

Tools also exist which collate data from many servers and show statistics like the CPU usage of the top ten servers; or the servers where the disk usage is greater than 90%.

Service Level Agreements (SLAs) are commonly provided which determine a minimum level of service to be provided by a computer system. Each SLA will include a maximum response time which is permitted under the SLA.

An object of the invention is to provide a method and associated apparatus which can indicate the capacity of a computer system relative to a predetermined SLA.

SUMMARY OF THE INVENTION

The present invention provides a method of analyzing the capacity of a computer system, the method including:
 a) measuring the system to obtain a datum population value which is indicative of a datum number of jobs;
 b) calculating a maximum population value which is indicative of a maximum number of jobs that the system can sustain whilst satisfying a predetermined Service Level Agreement (SLA);
 c) calculating a capacity indicator in accordance with the datum population value; and the maximum population value; and
 d) outputting the capacity indicator.

Knowing the capacity of a system in relation to a given SLA is very useful in a number of scenarios. For instance it enables an administrator to makes decisions more easily on upgrading existing capacity, to ensure that SLAs are not violated.

Since the capacity indicator can be output as a single number, it requires only a small amount of bandwidth to be output.

Typically step c) includes the step of calculating the ratio between the datum population value and the maximum population value. In the exemplary embodiment below this ratio is N1/N2. Alternatively step c) may include the step of calculating the difference between the datum population value and the maximum population value (that is, the difference N2−N1).

The capacity indicator may be output in any form. For instance the capacity indicator may be output in step d) to a controller which takes an automatic action in accordance with the value of the capacity indicator. The device may be a utility controller which provisions one or more additional processors if the value of the capacity indicator exceeds a threshold. Alternatively, or in addition to resulting in an automatic action, the capacity indicator may be output to a display device, in order to provide information to a system administrator or other person. The display device may provide a numerical indication of the capacity indicator, or more preferably the capacity indicator is displayed in a non-numerical graphical form. For instance the graphical form may comprise a shape which has a colored area with a size indicative of the capacity indicator.

Typically the maximum population value is calculated by calculating a response time associated with the maximum population value.

Typically the response time is modeled by analytical modeling, which uses a queuing network model for predicting the response time, typically along with other parameters such as, utilization, throughput and queue length. This enables the method to take into account queues that are forming in the system. An online book of queuing theory modeling for computer systems can be found in the text book "Quantitative system performance: computer system analysis using queuing network models", by Edward D. Lazowska et al, Prentice Hall, Inc, 1984, ISBN 0-13-746975-6. However other ways of obtaining response time may be used, for example by simulation.

Typically the maximum population value is calculated by calculating a response time for a series of population values including the maximum population value. In one example the series of population values comprises a series of increasing population values. Alternatively the series of population values may be chosen as a series of "binary search" values.

The computer system may consist of only a single device, such as a central processing unit (CPU) or a storage element (such as a disk). Alternatively the system may include two or more devices, each device including a respective processing queue. A separate capacity indicator may be calculated and output for each device, or an aggregate capacity indicator may be calculated by aggregating across the two or more devices. In a preferred example the aggregate capacity indicator is normalized according to the relative speeds of the devices.

The computer system being analyzed may be only a single server, or may include two or more servers, each server including a central processing unit and one or more storage elements.

Thus a small display (per server) can be provided, or can be expanded to a business unit or geographical area.

The datum population value may be a current population value which is indicative of a number of jobs currently being handled by the system. This enables the capacity indicator to be used to monitor the performance of a system in real time. Alternatively the datum population value may be a proposed population value which is indicative of a number of jobs proposed to be handled by the system. This enables the capacity indicator to be used to show whether an additional job can be added without resulting in SLA violation.

The method may be used to analyze an existing computer system, or may be used to analyze a proposed system. Thus for example the method may be used to evaluate a "what if" scenario; for instance "what if" one of the devices in an existing system is removed—will this result in SLA violation?

BRIEF DESCRIPTION OF THE DRAWINGS

Embodiments of the invention will now be described, by way of example only, with reference to the accompanying drawings in which.

DETAILED DESCRIPTION OF THE PREFERRED EMBODIMENTS

Figure 1:
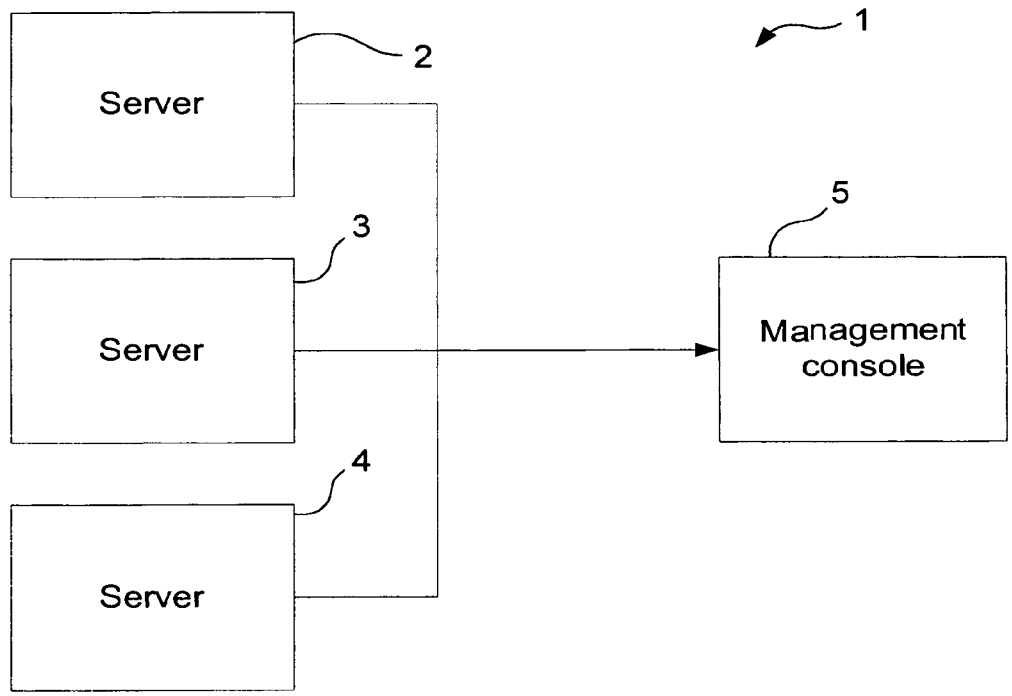
FIG. 1 is a schematic diagram of a computer network.

Referring to FIG. 1, a computer system 1 includes a number of servers 2, 3, 4 etc. which are monitored by a management console 5.

Figure 2:
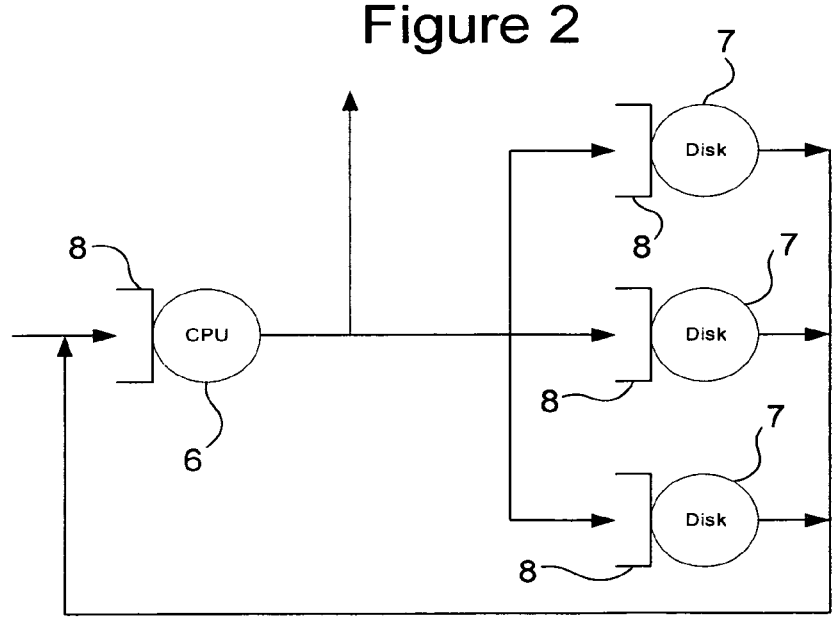
FIG. 2 is a schematic diagram of a server.

Each server 2-4 can be modelled schematically as shown in FIG. 2, and contains a number of server resources including a CPU 6, and disks 7.

Each server handles one or more applications. Each application is run by executing a series of processes. Each process is executed by utilising one or more of the server resources. It is assumed that any one process will only be utilising one of the server resources at any one time. Each resource includes a queue 8 for holding processes waiting to be executed.

Associated with each application is one or more Service Level Agreements (SLAs). In most cases the application will have only a single SLA which is the same for all servers. For example the SLA for the application may be R seconds i.e. the application must take less than or equal to R seconds for execution. However in rare cases the application may have different SLAs on different servers. For example one server may have a bigger memory cache than the others, or is itself faster, so may be expected to return responses faster than the other servers. In this case the SLA for that server will be shorter than for the other servers.

Figure 3:
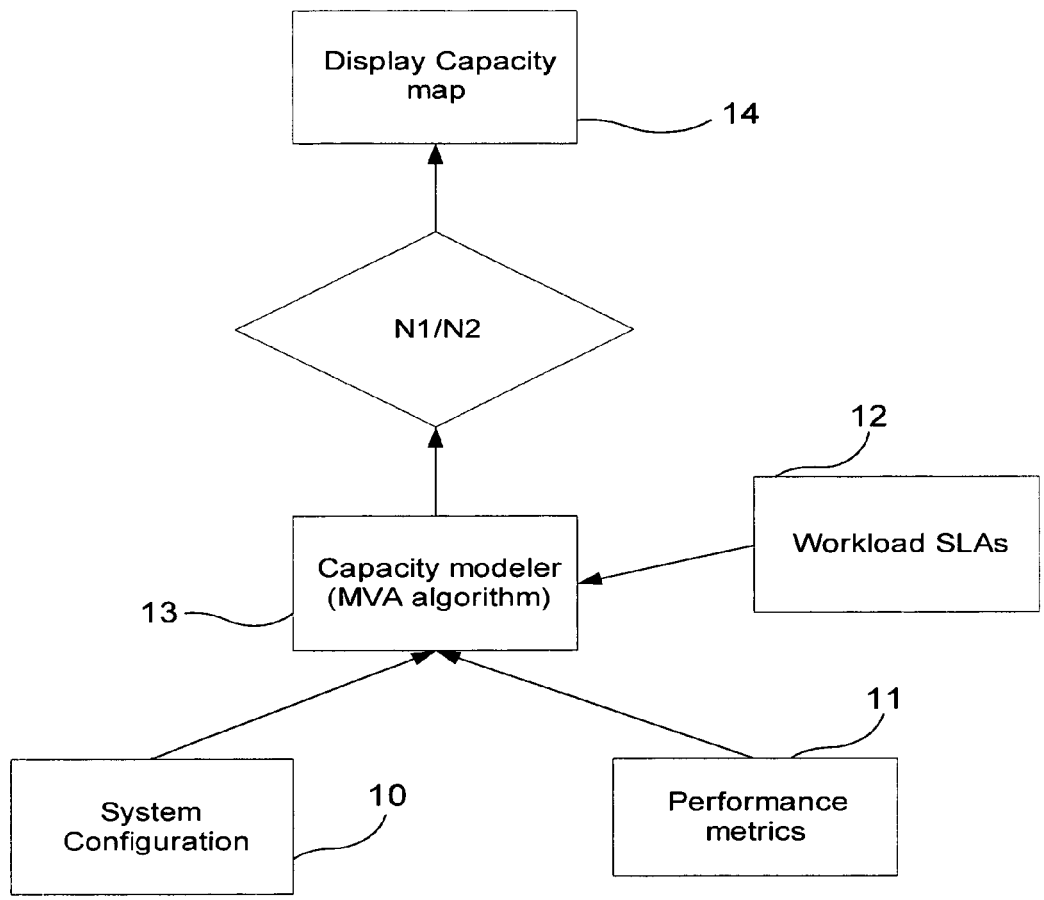
FIG. 3 is a flowchart illustrating the processes followed by the management console.

The management console 5 hosts a capacity planning engine computer program which is arranged to run the process illustrated in FIG. 3. The capacity planning engine takes as inputs system configuration data 10 (for example the number of servers, and the arrangement of resources for each server), performance metrics 11 (discussed below) and Workload Service Level Agreements (SLAs) 12 (that is, an SLA for each application currently being handled by a particular server), and runs a Mean Value Analysis (MVA) algorithm 13 that outputs utilizations, queue lengths and throughputs for each application.

Suitable tools for capacity modeling include BMC Predict and the Teamquest tool. A good overview of capacity modeling generally is "How to do Capacity Planning".

The system configuration data 10 and performance metrics 11 are gathered by HP OpenView Performance agent. The performance metrics 11 include the parameters Alive Population, Active Population, and Completed Population, as defined below.

The management console 5 monitors each server over a measurement interval which is referred to below as the parameter Measurement Interval. In case of the OpenView performance tools, the measurement interval for process metrics is one minute and for other metrics is five minutes. During this interval, some processes will be created and some will be completed. Thus at any time during the measurement interval there will be a number of processes which are alive, that is they have been created but not yet completed. Say, at the start of the interval there may be 20 alive processes, during the interval 20 more are created and 10 are completed. So at the end of the hour there are 30 alive processes and 10 processes have been completed. The parameter Alive Population is the sum of the ratio alive-process-time/Measurement Interval for every process belonging to a given application, where alive-process-time is a parameter indicating the amount of time during the measurement interval in which the process is alive. The parameter Active Population is the sum of the ratio active-process-time/Measurement Interval for every process belonging to a given application, where active-process-time is a parameter indicating the amount of time during the measurement interval in which the process is consuming server resources. For example Active Population may have a value of 20.

The parameter Completed Population is defined as the total number of processes that completed during the measurement interval.

Table 1 below illustrates a four second interval for two processes, A & B, for an application.

TABLE 1

|  | Time (seconds) | | | |
| --- | --- | --- | --- | --- |
|  | 1 | 2 | 3 | 4 |
| Process A | Alive | Alive | Alive | Alive |
| Process B | Alive/CPU | Alive/CPU | Alive | Dead |

Process A is alive for the entire four second interval but consumes no resources. A's contribution to Alive Population is 4*¼. A contributes 0*¼ to Active Population. B's contribution to Alive Population is 3*¼. B contributes 2*¼ to Active Population. Thus, for this interval, Active Population is 0.5 and Alive Population is 1.75. Because a process may be alive but not active, Active Population will always be less than or equal to Alive Population.

The parameter Completed Population for the measurement interval of Table 1 is 1 since process B died in the last second of the interval.

The measured response time is calculated from the performance metrics directly as follows:
1. Calculate the measured throughput of an application as: Measured Throughput=(Active Population+Completed Population/Measurement Interval
2. Measured Response Time=Active Population/Measured Throughput The parameter Modeled Response is calculated by performing MVA modeling on the basis of the configuration data 10 and performance metrics 11. The performance metrics 11 include the parameters Alive Population, Active Population, and Completed Population as defined above, for each application currently being handled by the system. The metrics also include a parameter Application Service Demand which indicates the demand of a particular application. As part of the modeling process, a parameter Average Queue Length is calculated. This is the queue length averaged over all server resources and all applications for the measurement interval. For each application, a parameter Modeled Response Time can be calculated as Modeled Response Time=Application Service Demand*(1+Average Queue Length).

The parameter Modeled Response Time is essentially the time to service all the applications in the queue+the time taken to service the current application.

The modeled throughput can then be calculated as Active Population/Modeled Response Time.

After modeling, models are usually calibrated (by introducing suitable delays) to make Modeled Response Time close to Measured Response Time.

A worked example is now given for a server running four applications: network, Memory_management, other_user_root and ParentWorkload. With reference to FIG. 3, the MVA algorithm performs the baseline capacity modeling for the server (inclusive of the application of interest). The MVA algorithm may be embodied in computer software. The baseline capacity model for the workload other_user_root is shown below.

Workload Name: other_user_root
Alive Population=50
Active Population=26.96
Completed Population=2264
Measured Throughput=0.636378
Measured Response Time=42.3648
Modeled Throughput=0.613187
Modeled Response Time=43.85

As can be seen above, the modeled response time is 43.85 seconds for an Active Population of 26.96 processes. Assume that the SLA is 50 seconds. We would like to know how many application instances of other_user_root can be supported without SLA violation. Following the baseline calculation, the management console evaluates "what if" scenarios for increments of 10 to Active Population to give the following results:

| Active Population | Modeled Response Time | Capacity Map |
|---|---|---|
| 26.96 (baseline) | 43.85 seconds | 36.45% |
| 36.96 | 44.15 | 49.97% |
| 46.96 | 44.68 | 63.49% |
| 56.96 | 45.66 | 77.01% |
| 66.96 | 47.60 | 90.53% |
| 73.96 (maximum) | 49.85 | 100% |

Computing "what if" scenarios for this workload showed that the response time would exceed the SLA of 50 seconds at an Active Population value of 73.96. Thus the maximum capacity for this workload on this server (assuming other workloads don't change) is 73.96. So the parameter Capacity Map for this workload on this server is defined as the current value for Active Population divided by the maximum value for Active Population (73.96 in this case). For instance, if the current value for Active Population is 60, then the application is running at 60/73.96=81.12% capacity.

Although an increment value of 10 is chosen above, other increment values could be used. Alternatively, instead of using fixed increments, the series of Active Population values may be chosen as a series of "binary search" values. That is, the first "binary search" value might be twice the baseline value, and if the response time associated with first "binary search" value exceeds the SLA, then the second "binary search" value is chosen to be 1.5 times the baseline value. Third, fourth etc. binary search values are then chosen in a similar manner until the Modeled Response Time approximates to the SLA.

Figure 5:
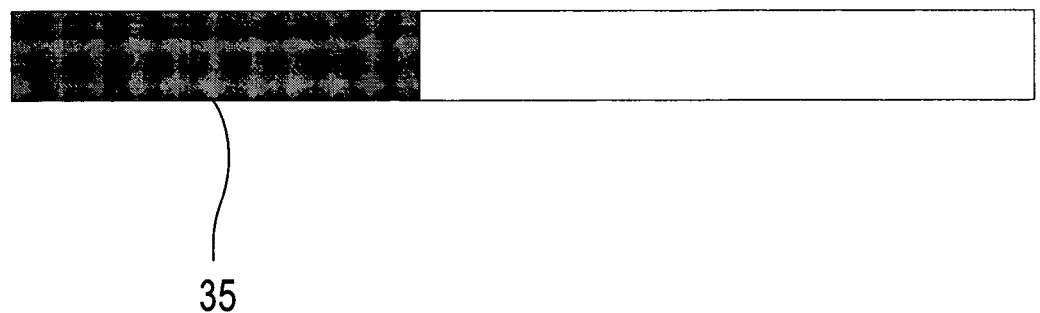
FIG. 5 shows an alternative capacity map.
Figure 6:
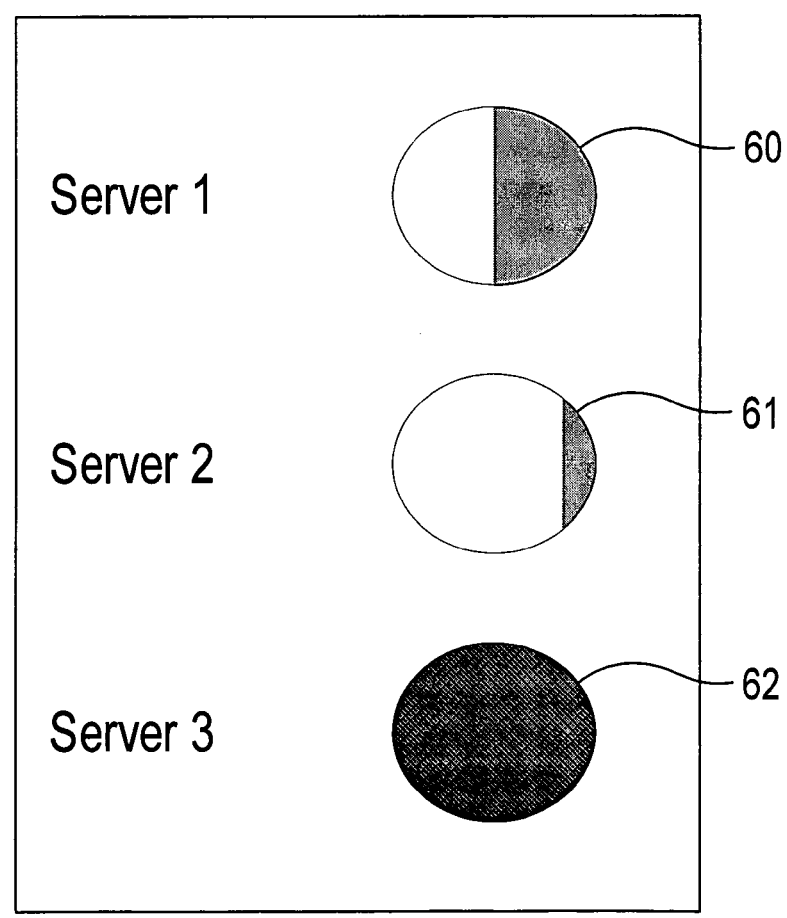
FIG. 6 shows a screen displaying capacity maps for a number of servers.

The parameter Capacity Map can then be displayed at step 14 of FIG. 3, using one of the methods described below with reference to FIGS. 4 to 6.

Figure 4:
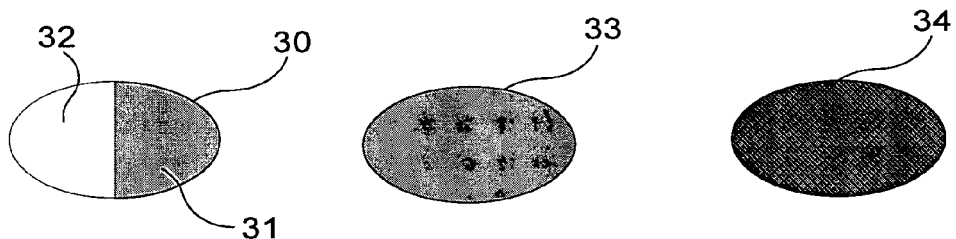
FIG. 4 shows three capacity maps.

Referring first to FIG. 4: if the ratio N1/N2 is less than one, then an ellipse 30 is displayed with a yellow region 31 having an area N1/N2 as a proportion of the total area of the ellipse. This yellow region 31 signifies the used capacity. The remaining region 32 having an area 1−N1/N2 is colored green to signify the spare capacity.

If (1−N1/N2)<0.05 then an ellipse 33 is displayed with the whole ellipse colored yellow to indicate that the server is approaching saturation and SLA violation.

If N1/N2>1, then an ellipse 34 is displayed with the whole ellipse colored red.

A large number of ellipses (for instance up to 100) can be displayed at the same time, giving a good visual feel of the capacity of the system.

Alternatively, the capacity map can also be displayed in other forms. An example is shown in FIG. 5. In this case instead of displaying an ellipse, a rectangle is displayed with a dark area 35 indicative of the Capacity Map value.

A number of different example uses of the invention will now be described.

In a first example, the maps can be displayed to give a quick indication of how the machines in a logical grouping (e.g. a department or business unit) are doing with respect to capacity. An example of such a display is shown in FIG. 6 for the system of FIG. 1. In this case, capacity map 60 shows the value for the server 2, capacity map 61 shows the value for the server 3, and capacity map 62 shows the value for the server 4.

In a second example, the maps for all the servers could be aggregated to show one aggregated map for the entire department. This could be extended to show maps for all the departments in an organization or even all the branches of the organization in a geographical area.

The aggregated maps would show the capacity at different resolutions. For example a system administrator may wish to see the map for all applications on a single server. A data center IT manager may like to see the maps aggregated across all applications for all servers. A "line of business" manager may wish to see maps "entity-wise" or "geography-wise".

The aggregated map may show the average of the Capacity Map parameter N1/N2. However a better alternative way would be to normalize the maps according to the relative server speeds and calculate a weighted average.

In a third example, capacity maps could be displayed on a "what if" basis. For instance a first capacity map may display a value of 70% for a D-class server, and a second capacity map would display the value for an N-class server. A capacity map can also be displayed for an application not running on the server provided one knows the demands on the CPU/disk for that application.

In a fourth example, the maps may be used as a tool for workload consolidation from an adaptive infrastructure point of view. For example the maps may be used to demonstrate a "what-if" scenario at an adaptive datacenter level, such as "what if I remove two servers?" If the capacity map for this datacenter is still all green, it will mean that two servers can be removed and used elsewhere. This of course implies that the application would be able to migrate vertically to another server and run there.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

A computer readable medium encoded with computer executable instructions which executed by the computer processor to perform the method steps.

What is claimed is:

1. A method of analyzing the capacity of a computer system, the method including:
   a) measuring in a management console the system to obtain a datum population value which is indicative of a datum number of jobs;
   b) calculating in said management console a maximum population value which is indicative of a maximum number of jobs that the system can sustain whilst satisfying a predetermined Service Level Agreement (SLA), the maximum population value calculated by applying binary search values to the datum population value and comparing the applied value to the SLA and by calculating a response time for a series of population values including the maximum population value;

c) calculating in said management console a capacity indicator in accordance with the datum population value; and the maximum population value; and d) outputting in said management console the capacity indicator.

2. A method according to claim 1 wherein step c) includes the step of calculating the ratio between the datum population value and the maximum population value.

3. A method according to claim 1 wherein step c) includes the step of calculating the difference between the datum population value and the maximum population value.

4. A method according to claim 1 wherein the capacity indicator is output in step d) by displaying the capacity indicator in a non-numerical graphical form.

5. A method according to claim 1 wherein the maximum population value is calculated in step b) by calculating a response time associated with the maximum population value.

6. A method according to claim 5 wherein the response time is calculated using a queuing theory model.

7. A method according to claim 1 wherein the system includes two or more devices, each device including a respective processing queue.

8. A method according to claim 7, wherein the capacity indicator is calculated in step c) by aggregating across the two or more devices and normalizing according to the relative speeds of the devices.

9. A method according to claim 1 wherein the system includes two or more servers, each server including a central processing unit and one or more storage elements.

10. A method according to claim 1 wherein the capacity indicator is output in step d) to a controller which takes an action in accordance with the value of the capacity indicator.

11. A method according to claim 10 wherein the controller provisions one or more additional processors if the value of the capacity indicator exceeds a threshold.

12. A method according to claim 1 wherein the system is handling one or more applications during the measurement step a), and the maximum population value is indicative of a maximum number of additional instances of a selected one of the applications that the system can sustain whilst satisfying a predetermined Service Level Agreement (SLA) associated with the selected one of the applications.

13. Apparatus configured to perform the method of claim 1.

14. A computer system including a server and a management console, wherein the management console is configured to perform the method of claim 1.

15. A computer readable medium encoded with computer executable instructions which are executed by a computer processor to perform the method of claim 1.

16. A system of analyzing the capacity of a computer system, the system including:

a) means for measuring the system to obtain a datum population value which is indicative of a datum number of jobs;

b) means for calculating a maximum population value which is indicative of a maximum number of jobs that the system can sustain whilst satisfying a predetermined Service Level Agreement (SLA), the maximum population value calculated by applying binary search values to the datum population value and comparing the applied value to the SLA and by calculating a response time for a series of population values including the maximum population value;

c) means for calculating a capacity indicator in accordance with the datum population value; and the maximum population value; and d) means for outputting the capacity indicator.

17. A system according to claim 16, wherein the means for calculating the capacity indicator comprises means for calculating the ratio between the datum population value and the maximum population value.

18. A system according to claim 16, wherein the means for calculating the capacity indicator comprises means for calculating the difference between the datum population value and the maximum population value.

19. A system according to claim 16, wherein the means for outputting the capacity indicator comprises means for displaying the capacity indicator in a non-numerical graphical form.

* * * * *